US010394334B2

United States Patent
Wang

(10) Patent No.: US 10,394,334 B2
(45) Date of Patent: *Aug. 27, 2019

(54) GESTURE-BASED CONTROL SYSTEM

(71) Applicant: Facebook Technologies, LLC, Menlo Park, CA (US)

(72) Inventor: Robert Wang, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,150

(22) Filed: Jun. 22, 2017

(65) Prior Publication Data
US 2017/0293364 A1    Oct. 12, 2017

Related U.S. Application Data

(63) Continuation of application No. 13/625,712, filed on Sep. 24, 2012, now Pat. No. 9,734,393.
(Continued)

(51) Int. Cl.
*G06F 3/01* (2006.01)
*G06K 9/62* (2006.01)
(Continued)

(52) U.S. Cl.
CPC .............. *G06F 3/017* (2013.01); *G06F 3/011* (2013.01); *G06K 9/00355* (2013.01);
(Continued)

(58) Field of Classification Search
CPC ..... G06F 3/011; G06F 3/017; G06K 9/00355; G06K 9/00389
See application file for complete search history.

(56) References Cited

U.S. PATENT DOCUMENTS 7,701,439 B2   4/2010   Hillis et al.
8,345,920 B2   1/2013   Ferren et al.
(Continued)

OTHER PUBLICATIONS

Molina et al. "Real-time user independent hand gesture recognition from time-of-flight camera video using static and dynamic models," Machine Vision and Applications (2013) 24: 187-204.*
(Continued)

*Primary Examiner* — Xuemei Zheng
(74) *Attorney, Agent, or Firm* — Fenwick & West LLP

(57) ABSTRACT

A method and system for human computer interaction using hand gestures is presented. The system permits a person to precisely control a computer system without wearing an instrumented glove or any other tracking device. In one embodiment, two cameras observe and record images of a user's hands. The hand images are processed by querying a database relating hand image features to the 3D configuration of the hands and fingers (i.e. the 3D hand poses). The 3D hand poses are interpreted as gestures. Each gesture can be interpreted as a command by the computer system. Uses for such a system include, but are not limited to, computer aided design for architecture, mechanical engineering and scientific visualization. Computer-generated 3D virtual objects can be efficiently explored, modeled and assembled using direct 3D manipulation by the user's hands.

17 Claims, 8 Drawing Sheets

Related U.S. Application Data

(60) Provisional application No. 61/613,429, filed on Mar. 20, 2012.

(51) Int. Cl.
    *G06K 9/46*     (2006.01)
    *G06K 9/00*     (2006.01)
    *G06T 7/73*     (2017.01)

(52) U.S. Cl.
    CPC ............ *G06K 9/00389* (2013.01); *G06T 7/74* (2017.01); *G06T 2207/20216* (2013.01); *G06T 2207/30196* (2013.01)

(56) References Cited

U.S. PATENT DOCUMENTS

| | | |
|---|---|---|
| 8,620,024 B2 | 12/2013 | Huang et al. |
| 8,872,899 B2 | 10/2014 | Givon |
| 9,207,852 B1 | 12/2015 | Zhou et al. |
| 2008/0013793 A1 | 1/2008 | Hillis et al. |
| 2009/0316952 A1 | 12/2009 | Ferren et al. |
| 2011/0129124 A1 | 6/2011 | Givon |
| 2012/0309532 A1 | 12/2012 | Ambrus et al. |

OTHER PUBLICATIONS

Candescent Nui, "CodePlex—Project Hosting for Open Source Software", Jan. 4, 2013, two pages. [Online] [Retrieved Jul. 20, 2014] Retrieved from the Internet <http://candescentnui.codeplex.com>.

Chu, S. et al., "Hand Gesture for Taking Self Portrait", Human-Computer Interaction, Part II, HCII 2011, LNCS 6762, 2011, pp. 238-247.

Lee, T. et al., "Handy AR: Markerless Inspection of Augmented Reality Objects Using Fingertip Tracking," Proc. IEEE ISWC, Oct. 11-13, 2007, Boston, MA, eight pages.

Plagemann, C. et al., "Real-Time Identification and Localization of Body Parts from Depth Images," 2010 IEEE International Conference on Robotics and Automation Anchorage Convention District, May 3-8, 2010, pp. 3108-3133.

Wang, R. et al., "6D Hands: Markerless Hand Tracking for Computer Aided Design," UIST' 11, Oct. 16-19, 2011, Santa Barbara, CA, USA, pp. 549-557.

Wilson, A., "Robust Computer Vision-Based Detection of Pinching for One and Two-Handed Gesture Input," UIST '06 Proceedings of the 19th annual ACN symposium on User interface software and technology, Oct. 15-18, 2006, pp. 255-258.

United States Office Action, U.S. Appl. No. 13/625,712, dated Sep. 22, 2016, 19 pages.

United States Office Action, U.S. Appl. No. 13/625,712, dated Nov. 27, 2015, 14 pages.

United States Office Action, U.S. Appl. No. 13/625,712, dated Dec. 10, 2014, 13 pages.

United States Office Action, U.S. Appl. No. 13/625,712, dated Oct. 28, 2014, 12 pages.

United States Office Action, U.S. Appl. No. 13/625,712, dated Apr. 30, 2014, 20 pages.

\* cited by examiner

GESTURE-BASED CONTROL SYSTEM

CROSS-REFERENCE TO RELATED APPLICATIONS

This application is a continuation of U.S. application Ser. No. 13/625,712, filed Sep. 24, 2012, which claims the priority benefit of U.S. patent application Ser. No. 61/613,429, filed Mar. 20, 2012, each of which are incorporated by reference in their entirety.

BACKGROUND OF THE INVENTION

1. Field of the Invention

Disclosed methods and systems relate to the technical field of human computer interaction and, more specifically, to a system for processing images of human hands to allow interaction with a computer.

2. Description of the Related Art

Determining the 3D pose of a user's hands, including their 3D position, orientation and the configuration of the fingers is referred to as "hand pose estimation." Hand pose estimation across a time sequence is referred to as "hand tracking." Hand tracking permits natural hand motions or gestures to be used as input to a computer system. However, traditional methods of hand tracking through image processing have not been efficient enough or robust enough to control a computer system in real-time. Instead, users have had to wear special instrumented or patterned gloves for a computer system to track the hands.

In some applications, such as computer aided design or entertainment applications, having to wear a glove to facilitate hand tracking is undesirable and impractical. Instrumented gloves are cumbersome and can reduce dexterity. Any type of glove can be uncomfortable to wear for a significant amount of time. The act of putting on or taking off a glove can be tedious and detract from the task at hand. Ideally, a user can interact with a computer using his hands in a completely unencumbered manner.

There is, therefore, a need in the art for improved system and methods for gesture-based control.

SUMMARY OF THE INVENTION

The disclosed systems and methods permit a user to interact with a computer using hand gestures. The configuration and movements of the hands and fingers, or hand gestures, can be used as input. A computer can generate a display that responds to these gestures. The generated display can include objects or shapes that can be moved, modified or otherwise manipulated by a user's hands.

In one embodiment, a pair of imaging devices mounted above a desk is used to record images of the user's hands. The image regions corresponding to each hand is determined and encoded as a descriptive feature. The feature is used to query a precomputed database that relates the descriptive features to 3D hand pose. The 3D poses of each hand are analyzed to interpret gestures performed by the user. One example of such a gesture is the action of grabbing. These interpreted gestures as well as the 3D hand poses can be used to interact with a computer.

In one embodiment, the imaging device can include a camera. The camera can further include a color video camera, an infrared camera, an ultra-violet camera, and a hyper-spectral camera. The hand region is segmented from the background based on the contrast between the skin tone of the hand region and the color, brightness or texture of the background. The descriptive feature used to encode each segmented hand image is a low-resolution silhouette of each hand region.

In another embodiment, the cameras used to record the user can include depth cameras. One type of depth camera includes an active stereo depth camera. For an active stereo depth camera, an infrared pattern is projected from a known position near each camera and the observed reflected pattern by the camera is interpreted as a depth image. The hand region is segmented from the background based on the calibrated 3D location of the desk and other objects in the background. Non-background regions of the depth image are presumed to be the user's hands. The descriptive feature used to encode each segmented hand depth image is a low-resolution depth image of each hand region.

One aspect of the invention relates to computing a database associating hand features to 3D hand pose. One way to achieve this database is by calibrating the interaction region and using computer graphics to render all possible hand poses in the interaction region. Each hand pose is rendered from the point of view of each camera, and the resulting images are encoded as descriptive features. The features from each camera view are then associated in the database with the hand pose used to generate the features. One way to reduce the size of the database is to render only the finger configurations that are used for gestures relevant to the system.

Another aspect of the invention uses descriptive image features to query the database relating image features to 3D hand poses. One way to achieve the image feature is to use a low-resolution silhouette of the segmented hand image or depth image. Another way to achieve the image feature is to use locality sensitive hashing of the segmented hand image or depth image. Another way to achieve the image feature is to use boosting on the database of hand images to learn the most descriptive elements of the hand image for distinguishing 3D hand pose. The hashed or boosted features can be stored compactly as short binary codes. Given input image features generated from the recorded hand images, the database can be queried by comparing the input feature with each feature in the database. The most similar features in the database and their corresponding 3D hand poses determine the estimated 3D hand pose of the user.

Another aspect of the invention interprets 3D hand poses as hand gestures. One particularly significant gesture is the precise grabbing or pinching gesture where the index finger and thumb make contact. One way to achieve the robust recognition of the grabbing gesture is by detecting extrema of the segmented hand image or depth image. The extrema points are corresponded with the predicted locations of the index and thumb finger-tips from the 3D hand pose. If a correspondence is found, the identified thumb and index finger tips in the hand images are then tested for contact.

DETAILED DESCRIPTION

Figure 1:
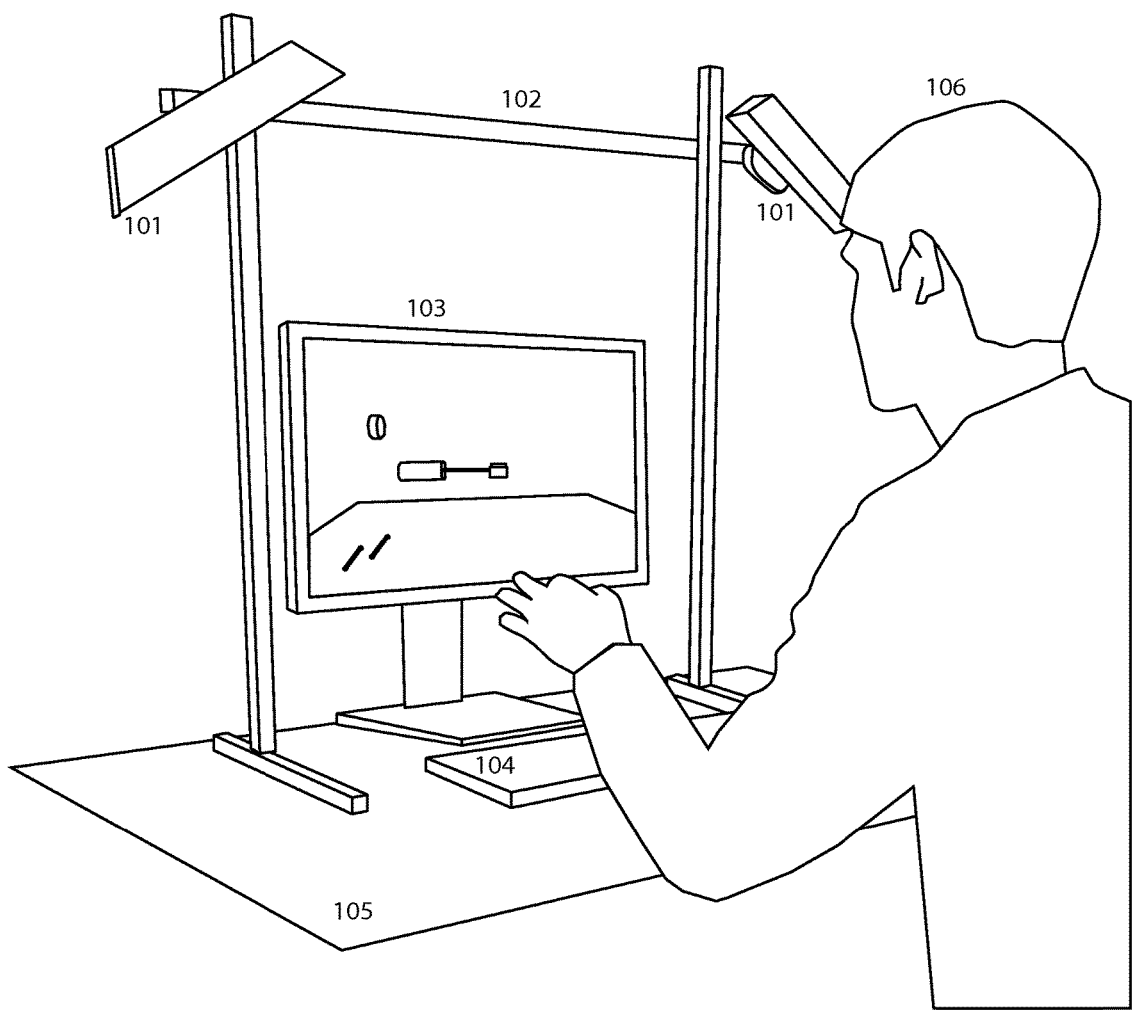
FIG. 1 shows a first configuration of a preferred embodiment using two cameras above a desk.

Several configurations of the invention are described below. In general, the present invention uses one or more cameras to observe the user's hands from different points of view. A computer (or other processing system) is used to generate a database based on the configuration of the cameras. At interaction time, a computer is used to process the images from the cameras and interpret them as hand gestures.

In certain embodiments, the user 106 is looking at a display 103 in front of him on a desk 105, and the cameras 101 are mounted above the desk on a frame 102. The desk supports the user's arms, which provides a comfortable user experience. The desk can also hold other user input devices 104 such as a mouse and keyboard. The user can switch from any input device to gestural user input by simply lifting his hands above the desk.

Figure 2:
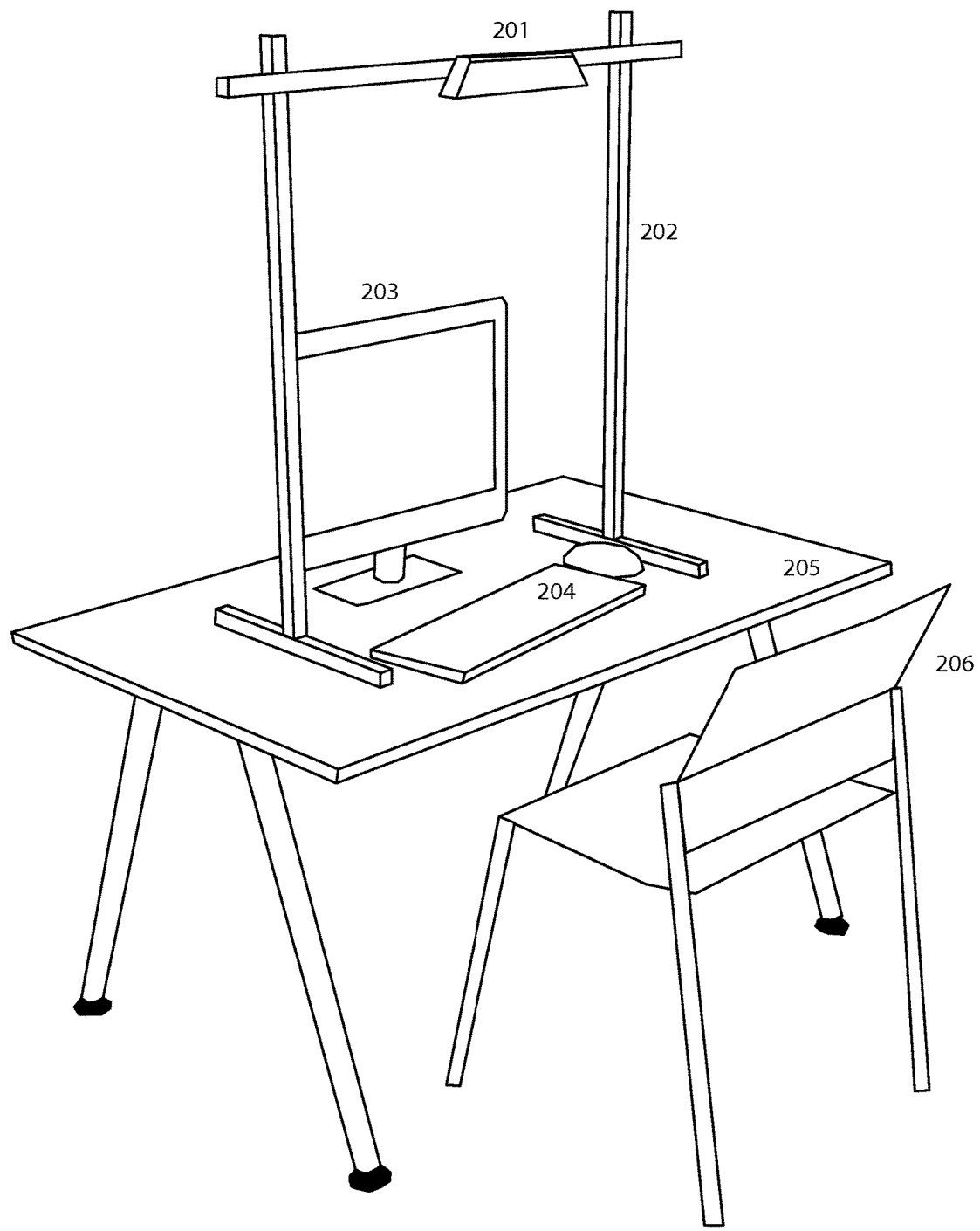
FIG. 2 shows a configuration where a single depth camera is above a desk.
Figure 3:
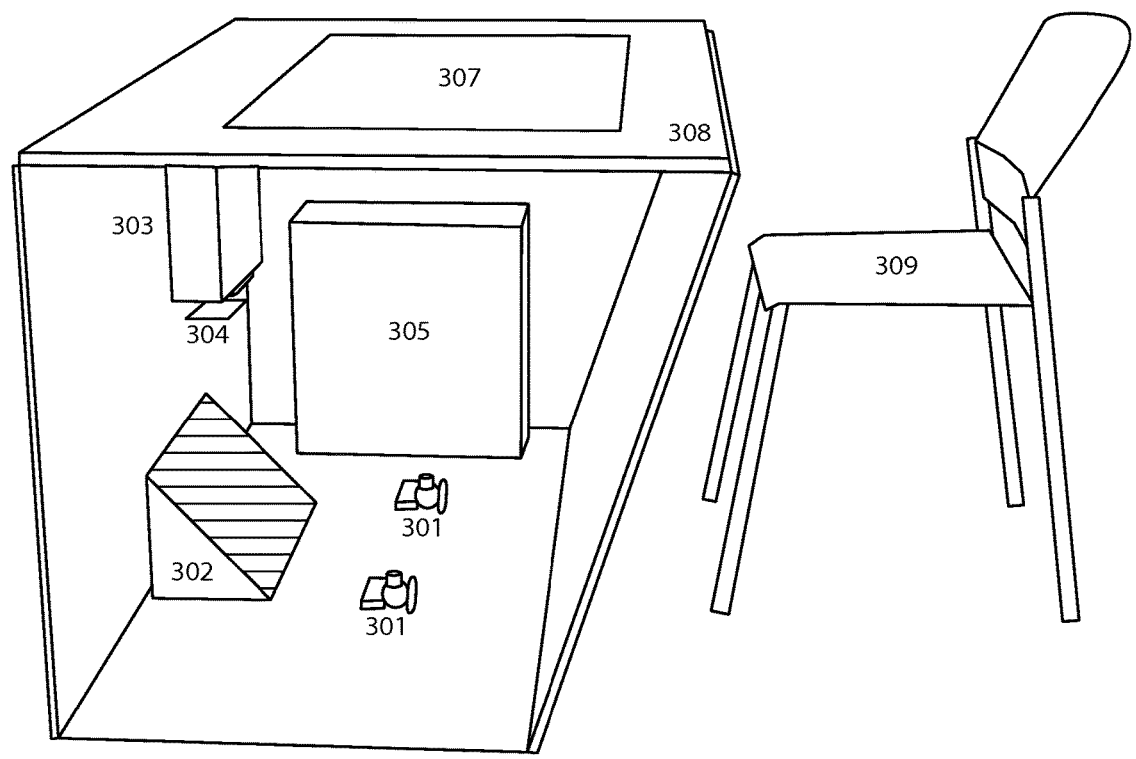
FIG. 3 shows a configuration where two cameras are below a transparent surface.
Figure 4:
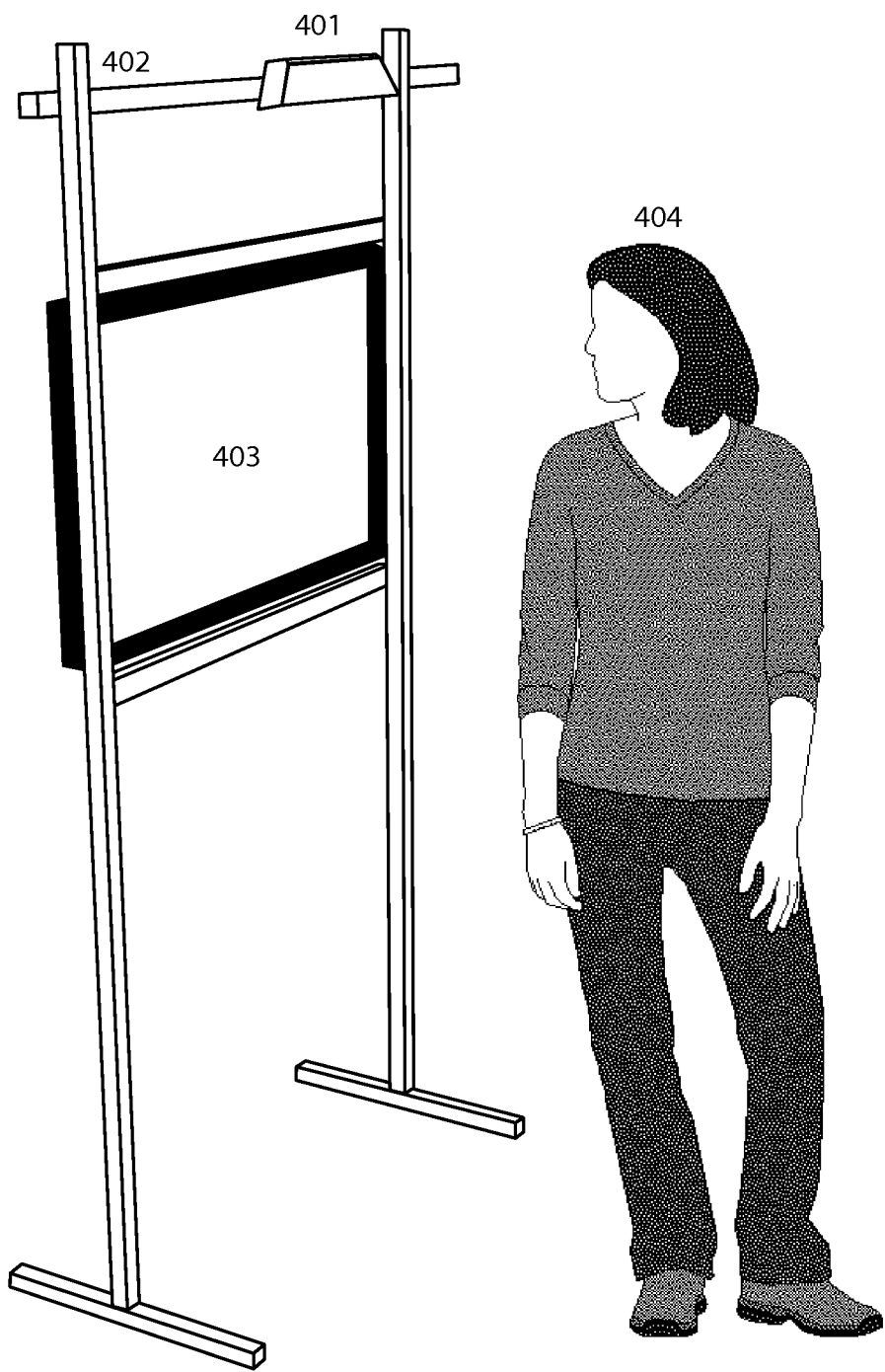
FIG. 4 shows a configuration where two cameras are mounted above a monitor and the user is standing.
Figure 5:
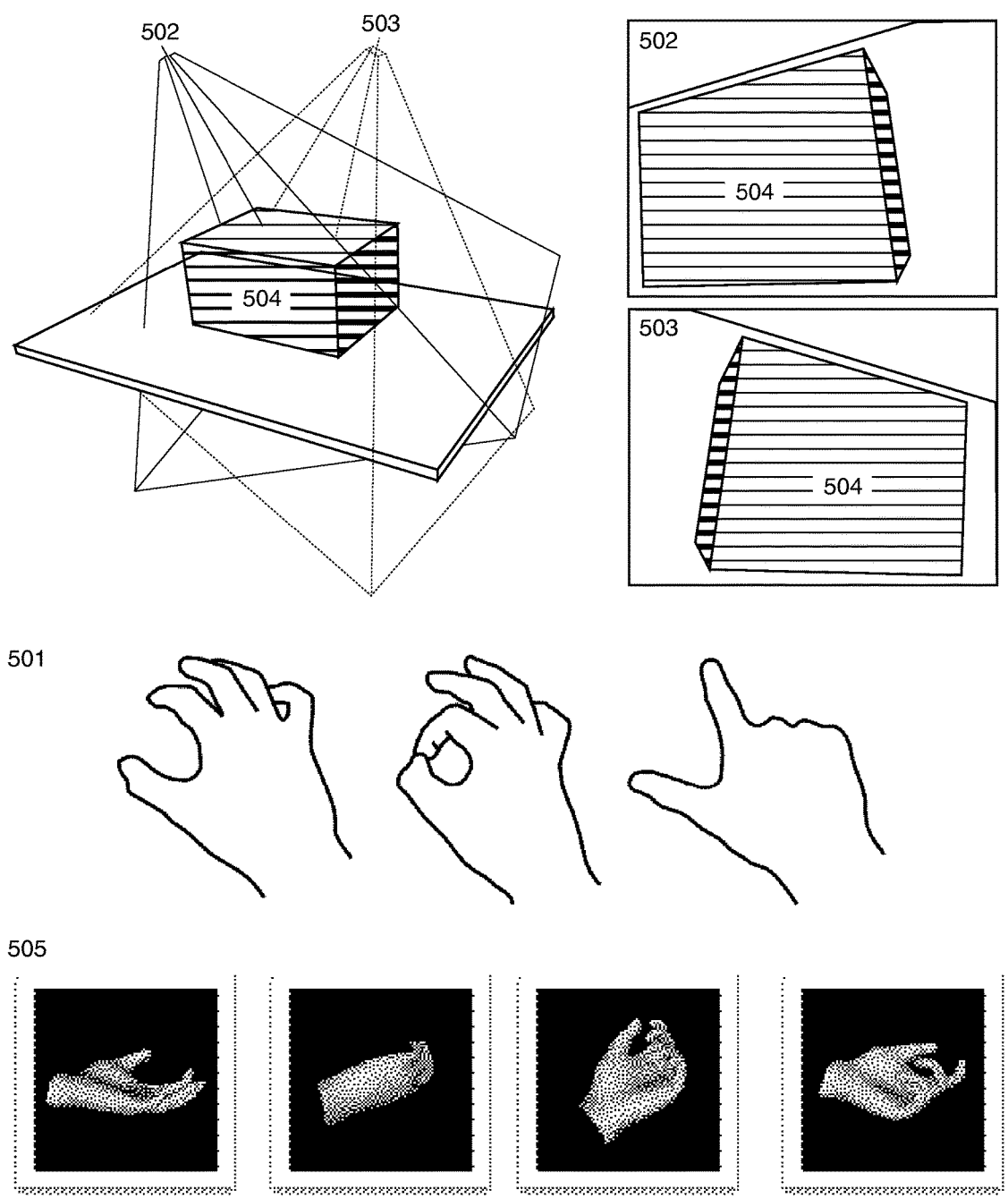
FIGS. 5 and 6 illustrate the process of generating a database of hand features.
Figure 6:
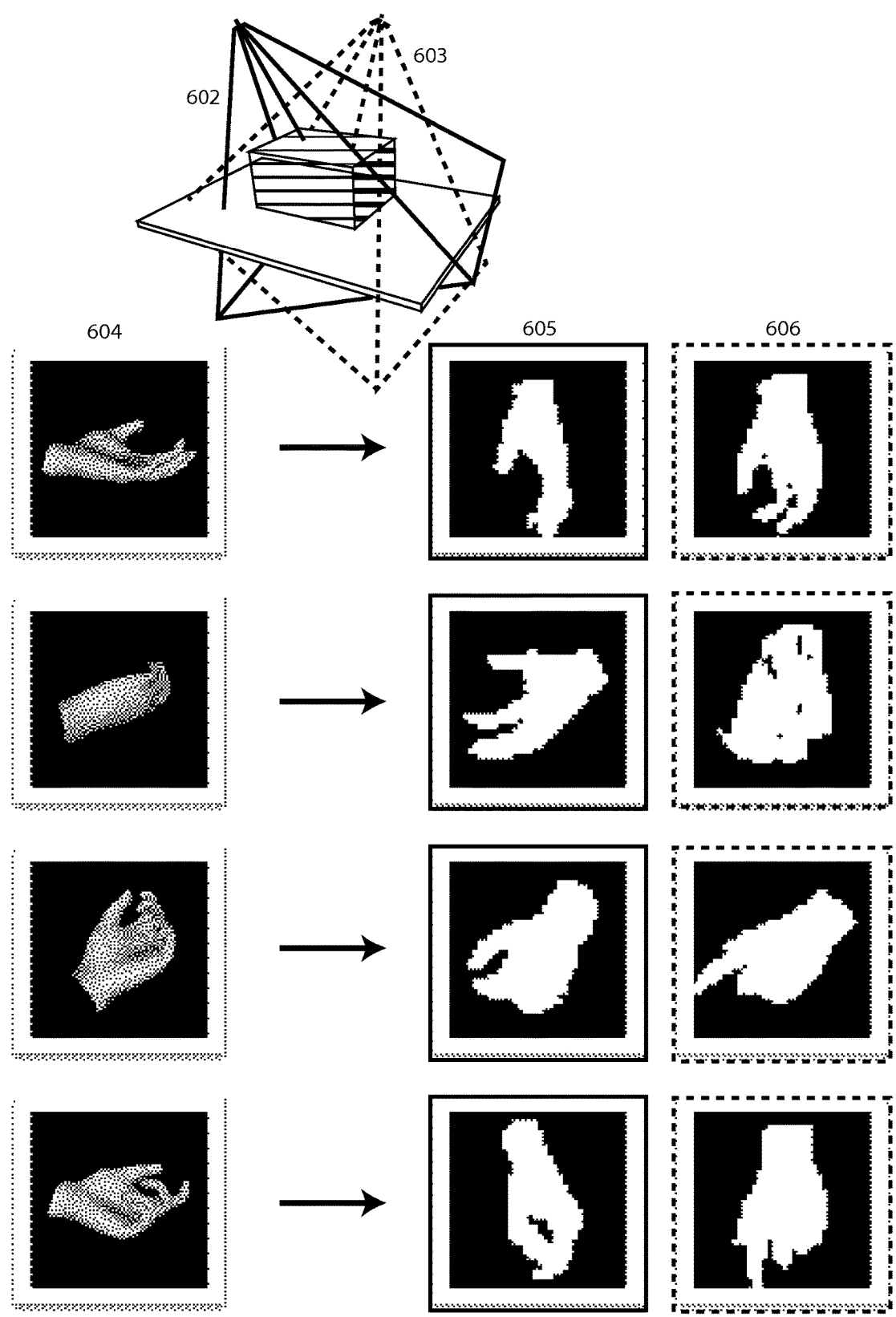
Figure 7:
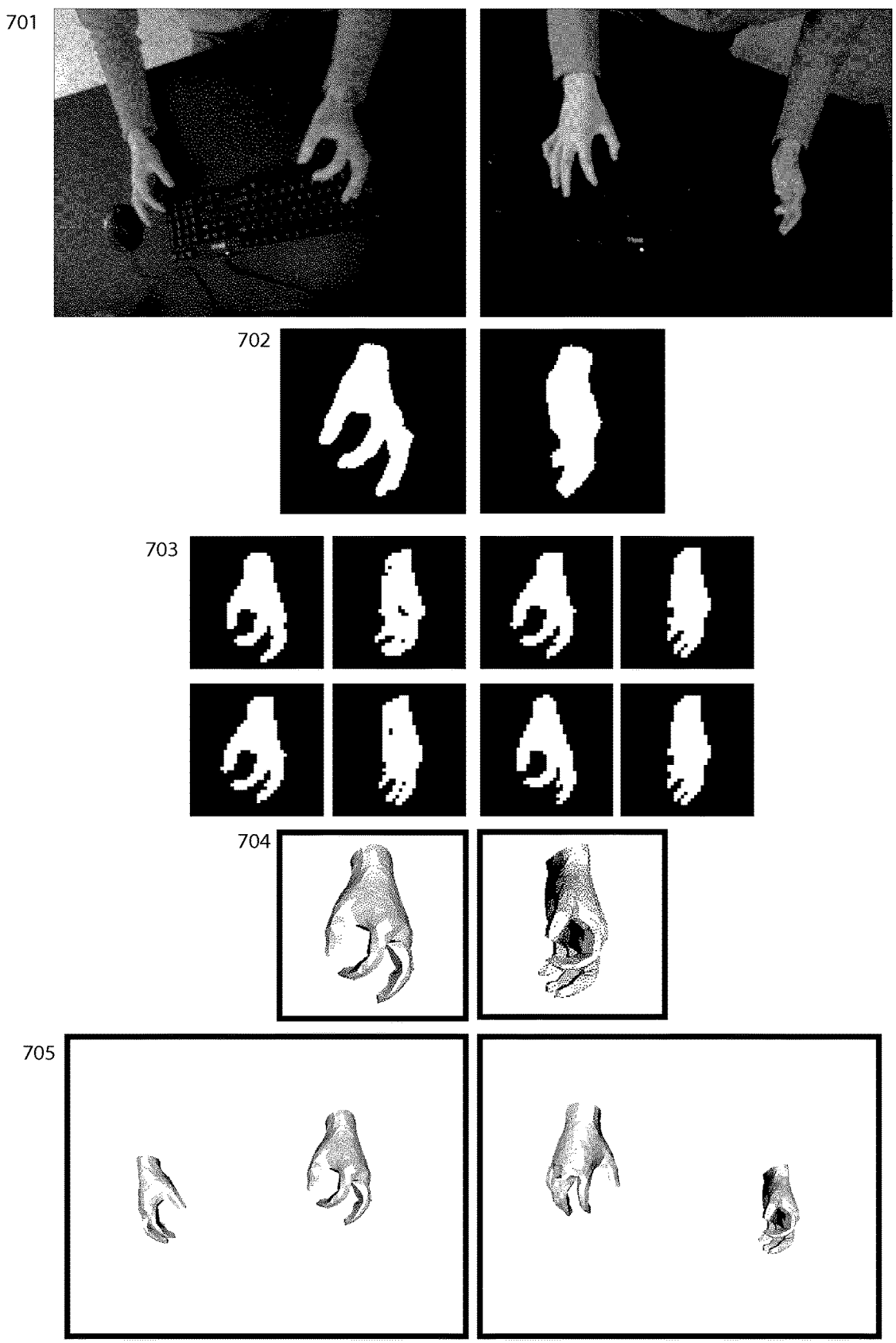
FIG. 7 illustrates the process for processing images into a 3D hand pose for the left hand.
Figure 8:
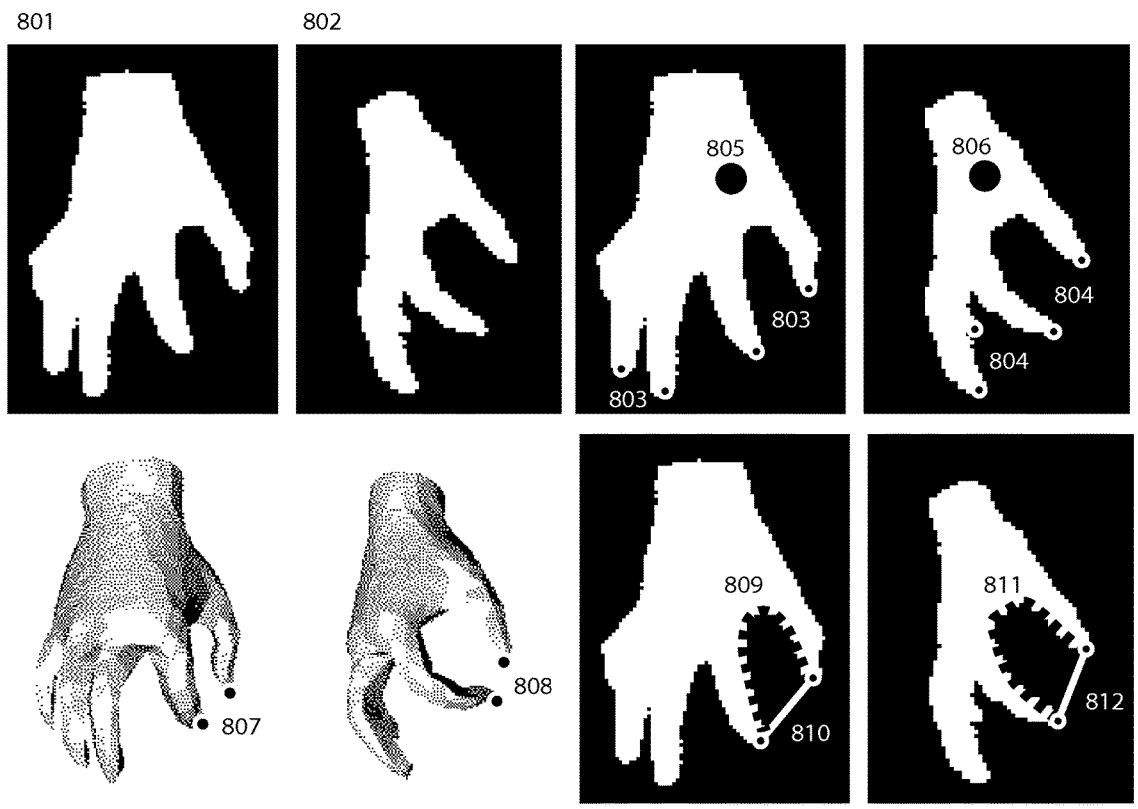
FIG. 8 illustrates the process of distinguishing a grabbing and non-grabbing gesture.

FIGS. 2, 3 and 4 show three alternative configurations of the system in accordance with certain embodiments. In FIG. 2, a single camera 201 is mounted above a desk 205 on a frame 202, pointed down toward the user's hands. A display 203 and other input devices 204 are also present on the desk. In FIG. 3, two cameras 301 are placed beneath a desk 308 with a transparent surface 307 and point up at the user. The transparent surface 307 can be simultaneously used as a display by being replaced with an electrically controlled diffuser and combined with a shutter 304, projector 303 and mirror 302. The diffuse surface 307 and shutter 304 are synchronized with the cameras 301 via a computer 305. In FIG. 4, two cameras 401 are mounted on a frame 402 above a display 403 and the user 404 is interacting with the computer system while standing.

Once a configuration of the cameras has been determined, a database mapping hand features to 3D hand pose is generated to facilitate hand pose estimation and hand tracking. The database generation can be done as follows.

First, the location of the 3D region where the user is expected to interact can be determined with respect to the cameras. This can be achieved by determining a volume 504 that fits within the camera view frustums 502, 503.

Once the interaction region has been determined, a large number of hand poses that fit in the region can be sampled. One way to achieve this is to generate a large set (e.g. 1QA6) of random hand poses with random orientation, position and finger configuration that fit in the interaction region. This large random set can be sampled efficiently using low dispersion sampling, Poisson disk sampling or best candidate sampling. The number of hand poses selected can be determined by the storage and processing limitations of the computer system. To reduce the number of hand poses, only finger configurations 501 that are related to the expected hand gestures 505 are used.

Once a set of hand poses has been selected, each pose 604 can be rasterized 605, 606 using computer graphics from the point of view of each camera 602, 603. This yields KN images given K cameras and N hand poses. To further reduce the number of images, each of the KN images can be approximated by M images. This can be determined by sampling the M most different images from the original KN images using a sampling technique such as low dispersion sampling, Poisson disk sampling, or best candidate sampling. Each of the KN images can be approximated by the best image in the set of M images. Alternatively, each of the KN images can be approximated by a linear combination of images selected from the set of M images.

Once the set of M images has been determined, a feature is computed for each image. One suitable feature is a low-resolution version of the image (e.g. 40×40 pixels), with the rasterized hand region centered and normalized to a particular size. To center and normalize the hand region, the mean and variance of the foreground hand pixels in the rasterized image are determined. The hand region is cropped so that the mean of the hand region pixels is at the center of the image. The hand region is then rescaled so that the standard deviation of the hand region pixels is set to a constant. Another suitable feature is a histogram of oriented gradients computed from the normalized hand region. Another suitable feature is a locality sensitive hash computed from the normalized hand region. Yet another suitable feature is a hash learned from the database using the Gentle Boost algorithm.

Given the set of M features, a database is generated so that each of the N hand poses is associated with the K approximate corresponding features computed from the rasterized hand images.

Once a database associating 3D hand poses and hand features has been generated, the system takes the K images from the cameras 701, 702 and segments the hand region in the images 702. The hand region is segmented from the background depending on the type of camera used.

For an RGB camera, color and texture models of the background and foreground (hand) are constructed. A color model can be constructed by fitting a mixture of Gaussians model. For the background, such a model is built per pixel. For the foreground, a mixture model for the skin tone of the hands is constructed. A background texture model can also be constructed by storing binary relative brightness relationships between each pixel and its neighbors. A classifier based on the background and foreground models is built to determine if each given pixel is part of the hand.

For a depth camera, or a camera providing depth images, a background model based on a calibrated background depth and known objects such as a desk surface is constructed. The non-background elements are assumed to be part of the foreground. Because both the arms and hands of the user are typically part of the foreground, the foreground pixels representing the arm and hand need to be distinguished. One way to achieve this is by using a co-located color camera to detect the skin tone of the bare hand. Another way to achieve this is by determining the primary axis of the arm and setting a cut-off plane to cull pixels greater than a certain distance from the tip of the hand.

Depth images can be obtained through several means, including but not limited to the following. One type of depth camera is an active stereo camera that uses an infrared projector and an infrared camera. The reflection of the project image observed by the camera is used to infer the depth of objects observed by the camera. Another type of depth camera uses two cameras to observe the scene from different viewpoints, the disparity between the images is used to infer depth. Another type of depth camera projects infrared light and measures the time of flight of the reflected light.

Once the hand has been segmented from the background for each of the camera view points, each of the K hand images are cropped and encoded in the format of the descriptive feature used to construct the database. The resulting K descriptive features per hand compose the query to the database. The K features of the query are compared with each key in the database. The L 3D hand poses 703 corresponding to the closest matching entries are returned. The 3D hand poses are then blended based on an exponential weighting of how close each result matched the query. That is, entries closest to the query are given the highest weighting. The blended 3D pose estimate 704 is then further refined with nonlinear optimization to best match the projection of the actual segmented hand from each camera view 705.

The 3D pose estimate is also temporally smoothed to be consistent with previous results. Assuming the hand is undergoing slow, smooth motion, the pose estimate is optimized to balance closeness to the previous pose with closeness to the observed hand images.

In one embodiment, the database described above is generated ahead of time before the start of processing the hand images. In another embodiment, some or all of the entries in the database are generated in real-time by the computer system during processing of the hand images. The entries generated can respond to the current estimated 3D hand pose to provide a denser sampling of database entries near the hand pose.

While a variety of 3D hand poses may be determined using the technique described above, one hand gesture of particular interest, the "pinching" or "grabbing" gesture, requires further processing to guarantee robust recognition. The pinching gesture consists of a subtle motion of the index finger and thumb that brings them into contact. When in contact, the hand is said to be in a "pinching pose." When the thumb and index finger are not in contact, the hand is in a "non-pinching" pose. Because the pinching motion is small and comfortable to perform, it is particularly well-suited to precise selection commands. However, such precise contact is difficult to detect with a database-driven hand detection approach, the region corresponding to the index finger and thumb is analyzed directly.

The processing to determine if the hand is pinching or not proceeds as follows. Given segmented images of the hand regions 801, 802, a set of "extrema" is computed in the finger/index finger region. These extrema are defined as the points furthest away from each other. A few points near the middle of the hand image 805, 806 are used to seed an iterative process to identify the furthest points to the extrema already selected. Once the extrema of the hand have been determined 803, 804, the two extrema closest to the predicted tips of the index finger and thumb 807, 808 are identified. Next, the geodesic distance between these two extrema 809, 811, or the distance between the extrema along the hand region, is determined. If the geodesic distance between the two extrema is much larger than the Euclidean distance, 810, 812, the hand is determined to be in a non-pinching pose. Otherwise, if the geodesic distance is approximately the same as the Euclidean distance or if two extrema cannot be identified near the predicted index finger and thumb points, the hand is determined to be in the pinching pose.

In one embodiment of the invention, the pinch detection processing can be performed on each of the image views. If a non-pinching pose is recognized in any of the camera views, the pose of the hand is determined to be non-pinching. In another embodiment of the invention, the pinch detection is performed on a synthetic view of the hand constructed by re-projecting depth data on a plane fit to the predicted points of the index finger and thumb.

The gesture-based control system can be used in a variety of applications. The 6D position and orientation input from each hand is particularly useful for natural 3D manipulation tasks such as computer aided design and the virtual assembly of mechanical parts. Because the system does not require instrumentation or gloves, it works well in a typical desktop computing environment. The user can switch between typing or using the mouse to gesturing by simply lifting up his or her hands, without having to put on a special glove or tracking device. Several configurations of the invention fit on top of a normal desk. The robust recognition of the pinching gesture enables the user to make comfortable input motions, reducing fatigue.

Other 3D manipulation applications include training applications for aircraft maintenance where the student virtually manipulates 3D tools to train muscle memory, design of 3D protein structures to match x-ray crystallography data for medical research, gaming applications where the user controls a virtual avatar or virtual hands, computer animation tasks where the user controls the configuration and timing of a virtual actor, and 3D sculpting for free-form modeling.

Another application of the system is to the field of robotic control, where the robot serves as part of the computer system directly controlled by the user's hand motions.

The hand tracking system described above can be used in conjunction with a variety of display systems including plasma, LCD, stereoscopic, and video wall displays. Processing can be performed either on the computer system connected to the display or on a remote networked computer system to which the camera image data is sent.

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving image information about a hand from one or more imaging devices;
   identifying the hand against a background from the received image information;
   identifying, based on a geodesic image distance, a pose of the hand in the received image information by:
      calculating the geodesic image distance between a plurality of extrema of the hand, wherein each extrema comprises a finger of the hand; and
      determining a pose of the hand based on the geodesic image distance and the received image information;
   recognizing that the identified pose of the hand is associated with one or more hand gestures of a plurality of hand gestures; and
   generating a control command based on the recognized one or more hand gestures.

2. The method of claim 1, wherein identifying a pose of the hand comprises identifying contact between two or more fingers of the hand.

3. The method of claim 2, wherein the two or more fingers are identified based on extrema of the received image information about the hand.

4. The method of claim 1, wherein determining a pose of the hand based on the geodesic image distance and the received image information comprises comparing the geodesic image distance between extrema of the hand with the Euclidian distance between extrema of the hand.

5. The method of claim 1, wherein identifying a pose of the hand further comprises:
   identifying a plurality of potential poses of the hand based on the received image information; and
   blending the plurality of potential poses of the hand to form an estimated pose of the hand.

6. The method of claim 5, further comprising determining, based on the calculated geodesic image distance, if the estimated pose of the hand represents a "pinching" gesture featuring contact between two or more fingers of the hand.

7. A non-transitory computer-readable storage medium comprising instructions which, when executed by a processor, cause the processor to perform the steps of:
   receiving image information about a hand from one or more imaging devices;
   identifying the hand against a background from the received image information;
   identifying, based on a geodesic image distance, a pose of the hand in the received image information by:
      calculating the geodesic image distance between a plurality of extrema of the hand, wherein each extrema comprises a finger of the hand; and
      determining a pose of the hand based on the geodesic image distance and the received image information;
   recognizing that the identified pose of the hand is associated with one or more hand gestures of a plurality of hand gestures; and
   generating a control command based on the recognized one or more hand gestures.

8. The non-transitory computer-readable storage medium of claim 7, wherein identifying a pose of the hand comprises identifying contact between two or more fingers of the hand.

9. The non-transitory computer-readable storage medium of claim 8, wherein the two or more fingers are identified based on extrema of the received image information about the hand.

10. The non-transitory computer-readable storage medium of claim 7, wherein determining a pose of the hand based on the geodesic image distance and the received image information comprises comparing the geodesic image distance between extrema of the hand with the Euclidian distance between extrema of the hand.

11. The non-transitory computer-readable storage medium of claim 7, wherein identifying a pose of the hand further comprises:
   identifying a plurality of potential poses of the hand based on the received image information; and
   blending the plurality of potential poses of the hand to form an estimated pose of the hand.

12. The non-transitory computer-readable storage medium of claim 11, further comprising determining, based on the calculated geodesic image distance, if the estimated pose of the hand represents a "pinching" gesture featuring contact between two or more fingers of the hand.

13. A system comprising:
   a communication interface configured to receive image information about a hand from one or more imaging devices;
   a processor for executing instructions stored in memory, wherein the execution of the instructions by the processor performs the steps of:
      identifying the hand against a background from the received image information;
      identifying, based on a geodesic image distance, a pose of the hand in the received image information by:
         calculating the geodesic image distance between a plurality of extrema of the hand, wherein each extrema comprises a finger of the hand; and
         determining a pose of the hand based on the geodesic image distance and the received image information;
      recognizing that the identified pose of the hand is associated with one or more hand gestures of a plurality of hand gestures; and
      generating a control command based on the recognized one or more hand gestures.

14. The system of claim 13, wherein identifying a pose of the hand comprises identifying contact between two or more fingers of the hand.

15. The system of claim 14, wherein the two or more fingers are identified based on extrema of the received image information about the hand.

16. The system of claim 13, wherein determining a pose of the hand based on the geodesic image distance and the received image information comprises comparing the geodesic image distance between extrema of the hand with the Euclidian distance between extrema of the hand.

17. The system of claim 13, wherein identifying a pose of the hand further comprises:
   identifying a plurality of potential poses of the hand based on the received image information; and
   blending the plurality of potential poses of the hand to form an estimated pose of the hand.

* * * * *